United States Patent [19]

Newman

[11] Patent Number: 4,746,439
[45] Date of Patent: May 24, 1988

[54] PROCESS FOR REMOVAL OF HEAVY METAL CONTAMINATION IN WASTE WATER

[75] Inventor: Mildred M. Newman, Littleton, Colo.

[73] Assignee: Manville Corporation, Denver, Colo.

[21] Appl. No.: 50,351

[22] Filed: May 15, 1987

[51] Int. Cl.$^4$ ................................................ C02F 1/42
[52] U.S. Cl. .................................... 210/688; 210/912; 210/913
[58] Field of Search ............... 210/688, 912, 913, 663, 210/665, 667; 502/410, 411

[56] References Cited

U.S. PATENT DOCUMENTS

| 2,640,756 | 6/1953 | Wills | 210/688 |
|---|---|---|---|
| 4,210,530 | 6/1980 | Etzel et al. | 210/688 |
| 4,508,742 | 4/1985 | McLaughlin et al. | 502/410 |
| 4,530,765 | 7/1985 | Sabherwal | 210/688 |

*Primary Examiner*—Tom Wyse
*Attorney, Agent, or Firm*—J. D. Lister; C. P. Quinn; G. A. Evearitt

[57] ABSTRACT

Alkaline earth silicate solids with a surface area in the range of about 0.1–1000 $m^2/g$ are used to remove Ag, Pb, Zn, Ni, and Cr (III) metal ions from contaminated waste waters. The foregoing metal ions are removed from the contaminated waste waters by a process involving the steps of contacting the contaminated waste waters at a pH in the range of 4 to 6 with the alkaline earth silicate solid and thereafter filtering the alkaline earth silicate solid from the contaminated waste waters to remove the metal ions.

12 Claims, No Drawings

PROCESS FOR REMOVAL OF HEAVY METAL CONTAMINATION IN WASTE WATER

FIELD OF THE INVENTION

This invention relates to a process for the removal of heavy metals from waste waters and more particularly, it relates to the removal of heavy metals from waste waters with the use of an alkaline earth silicate solid.

BACKGROUND OF THE INVENTION

Over the past decade the emphasis on the treatment of waste waters has steadily increased. "Superfunds" have been established to focus attention on discovering methodologies for groundwater pollution control. Frequent revelations of water pollution and new legislative initiatives and management strategies for pollution control heighten the awareness of the public of the growing problem. There is currently a heavy stress on industry to minimize their contribution to a problem that if not controlled, could reach crisis proportions in the next couple of decades. EPA effluent limitations for point source discharges into waterways or publicly owned treatment works emphasize the control of toxic materials. Among the many toxic materials identified by the EPA are heavy metals which include but are not limited to zinc, nickel, silver, chromium, lead, and arsenic. To protect the public health, EPA regulations have forced companies into compliance. Since the penalties for non-compliance can be severe, e.g. fines and closure, there is a strong incentive in industry to search for economic and efficient ways to meet the regulations.

The state of the art in industry is the use of neutralization and precipitation methods as techniques for removal of heavy metals from waste waters. Each method presents its own distinct disadvantage. In many cases one toxin is substituted for another which may minimize the individual contribution to pollution and meet the EPA regulations but does not eliminate pollution as a whole. Activated charcoal and polymeric ion exchange resins are also used in industry but they do not adsorb heavy metals very well. Their practicality is further diminished by the fact that these products are very expensive.

Thus, up to this point in time there has not really been an effective material available to industry to use for the removal of heavy metals from streams, waste waters, and the like.

What is needed in the industry, therefore, is an economic and effective process for the decontamination and removal of as many contaminating heavy metals as possible from waste waters, streams, and other bodies of water.

BRIEF SUMMARY OF THE INVENTION

Applicant has discovered an economical process for the decontamination and removal of at least one of Ag, Pb, Cr (III), Zn, and Ni metal ions from waste streams and the like which contain one or more of the same. The inventive process comprises contacting the contaminated waste water with an alkaline earth silicate solid having a surface area in the range of about 0.1–1000 $m^2/g$. Upon contact with the alkaline earth silicate, the heavy metal ions are adsorbed into the surface of the silicate and when filtered are permanently removed from the waste water.

Other features and aspects of the invention as well as their benefits, will be made clear in the more detailed description of the invention which follows.

DETAILED DESCRIPTION OF THE PRESENT INVENTION

The alkaline earth silicate solid used in the present invention may be of either natural or synthetic origin. Magnesium and calcium silicates have been found to be especially useful.

The alkaline earth (Group IIA) silicate solid may be in the form of a pellet, sphere, powder or other form which is suitable for contact with the contaminated body of water containing the metal ions. The powdered form is presently preferred since it offers the greatest surface area ($m^2/g$).

Broadly, the alkaline earth silicate solid should have a surface area in the range of about 0.1–1000 $m^2/g$ and preferably, about 50–200 $m^2/g$.

Utilizing the process of the present invention, Ag, Pb, Cr (III), Zn, and Ni ions may be removed from contaminated waste streams and other bodies of water containing at least one or more of such metal ions. In the most typical of situations where the inventive process is employed, the metal contaminated stream or the like is contacted with alkaline earth metal silicate and filtered to decontaminate the stream.

The following non-limiting example further illustrates the present invention.

EXAMPLE

Magnesium and calcium silicate materials were used to determine their effectiveness in adsorbing various metals. Various 30 ml. samples of pH adjusted 0.1 N sodium acetate buffer, each containing an intial metal ion concentration of 10 ppm, were contacted with 1 gram of powdered calcium or magnesium silicate for 10 minutes at 40° C. Each sample was then vacuum filtered and the filtrate was analyzed on an analytical inductively coupled plasma unit (ICP) for the remaining metal ion concentration.

The materials tested and the test results are listed in Table I.

TABLE I

| | Metal Ion, Final Concentration (ppm) | | | | | |
|---|---|---|---|---|---|---|
| Material | Zn (pH = 4) | Zn (pH = 6) | Cr (III) (pH = 6) | Ag (pH = 6) | Ni (pH = 6) | Pb (pH = 6) |
| Control | 10 | 10 | 10 | 10 | 10 | 10 |
| Mg Silicate | 1.40 | .02 | 1.4 | .08 | 1.20 | .80 |
| | | .08 | | .14 | | |
| | | .10 | | | | |
| Ca Silicate | .10 | .01 | .01 | .03 | 3.80 | .05 |
| | | .06 | 1.60 | .06 | | .10 |
| | | | 1.50 | | | |

Similar tests were also conducted varying the initial Ag metal ion concentration from 1 ppm to 10 ppm to 100 pm. The materials tested and the test results are listed in Table II.

TABLE II

| Material | Initial Ag Ion Concentration | | |
|---|---|---|---|
| | 1 ppm | 10 ppm | 100 ppm |
| Control | 1.0 | 10.00 | 100.00 |
| Mg Silicate | .01 | .08 | 56.0 |
| Ca silicate | .01 | .06 | 6.2 |

The foregoing data illustrate that the powdered magnesium and calcium silicates will remove Zn, Ag, Cr (III), Ni, and Pb ions significantly.

The use of the alkaline earth metal silicates as adsorbents of heavy metals are relatively inexpensive compared to activated charcoal and polymeric resins. The use of the silicates is also advantageous compared to present methods because when the silicates are used alone or in combination with a low cost filter aid they are easily removed from waste streams and in the process carry the contaminant heavy metal ion with them.

Reasonable modifications and variations are possible from the foregoing disclosure without departing from either the spirit or scope of the present invention.

I claim:

1. A process for the decontamination and removal of at least one metal ion selected from the group consisting of Ag, Pb, Cr (III), Zn, and Ni from contaminated waste waters containing at least one of said metal ions, the process consisting essentially of the steps of: (a) contacting said contaminated waters at a pH in the range of 4 to 6 with an alkaline earth silicate solid having a surface area in the range of about 0.1-1000 m$^2$/g, and (b) thereafter filtering said alkaline earth silicate solid from said contaminated waste waters to remove said metal ion.

2. A process according to claim 1 wherein said metal ion removed is Ag.

3. A process according to claim 1 wherein said metal ion removed is Pb.

4. A process according to claim 1 wherein said metal ion removed is Cr (III).

5. A process according to claim 1 wherein said metal ion removed is Zn.

6. A process according to claim 1 wherein said metal ion removed is Ni.

7. A process according to claim 1 wherein said alkaline earth silicate solid is calcium silicate.

8. A process according to claim 1 wherein said alkaline earth silicate solid is maganesium silicate.

9. A process according to claim 1 wherein said alkaline earth silicate solid is in the form of a sphere.

10. A process according to claim 1 wherein said alkaline earth silicate solid is in the form of a pellet.

11. A process according to claim 1 wherein said alkaline earth silicate solid is in the form of powder.

12. A process according to claim 1 wherein said alkaline earth metal silicate solid has a surface area in the range of about 50-200 m$^2$/g.

* * * * *